United States Patent Office 3,000,949
Patented Sept. 19, 1961

---

3,000,949
NITRAMINES
Milton B. Frankel, Pasadena, and Karl Klager, Monrovia, Calif., assignors to Aerojet-General Corporation, Azusa, Calif., a corporation of Ohio
No Drawing. Filed Feb. 19, 1957, Ser. No. 641,438
16 Claims. (Cl. 260—583)

This invention relates to new compositions of matter and a method for their preparation. In particular, this invention relates to nitramines having the general formula:

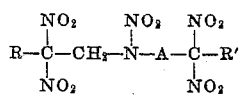

wherein A is an alkylene radical and R and R' are the same or different and are nitro or alkyl radicals, at least one R being alkyl.

This application is a continuation-in-part of our copending United States patent application Serial No. 421,985, filed April 8, 1954, now abandoned.

These compounds, because of their favorable oxygen balance, find valuable use as explosives as well as additives for propellant fuels.

The compounds of this invention are prepared by reacting a secondary amine with nitric acid, in accordance with the general reaction scheme set forth below:

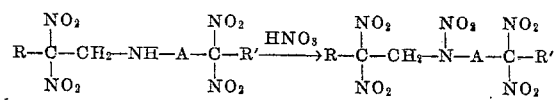

wherein A, R and R' are as defined above.

The amines used as starting materials in this invention are prepared by condensing a β-geminal dinitro alcohol with an amine, as disclosed in our copending application Serial No. 578,153, filed April 13, 1956.

To more fully illustrate our invention, the following examples are presented. It is to be understood, however, that these examples are presented merely as a means of illustration and are not intended to limit the scope of the invention in any way.

EXAMPLE I

*Preparation of N-3,3-dinitrobutyl-N-2,2,2-trinitroethyl nitramine*

A solution of N-3,3-dinitrobutyl-N-2,2,2-trinitroethyl amine in acetic anhydride was added dropwise to 100% nitric acid while maintaining the temperature at 5° C. The resulting solution was poured over ice yielding a yellow oil which slowly crystallized. The solid was collected, washed with water and recrystallized from chloroform to give 16.6 gm. of a cream-colored solid. Recrystallization from chloroform yielded cream-colored crystals, M.P. 105–107° C., with decomposition, which exhibited an impact stability of 25 cm./2 kg. The elemental analysis of the product is as follows:

Calculcated for $C_6H_9N_7O_{12}$: percent C, 19.41; percent H, 2.44; percent N, 26.42. Found: percent C, 20.18; percent H, 2.53; percent N, 26.44.

The heat of combustion was calculated to be 2232 cal./gm. and was found to be 2229 cal./gm. The explosive values of this compound are as follows:

| | | |
|---|---|---|
| Lead Block Value | 162 | T.N.T.=100 |
| Ballistic Mortar Value | 153 | T.N.T.=100 |

EXAMPLE II

*Preparation of N-3,3,3-trinitropropyl-N-2,2-dinitropropyl nitramine*

A solution of N-3,3,3-trinitropropyl-N-2,2-dinitropropyl amine in acetic anhydride was added dropwise to 100% nitric acid while maintaining the temperature at 5° C. The resulting solution was poured on ice precipitating a cream-colored solid which was collected, washed with water and dried. Recrystallization from carbon tetrachloride yielded cream-colored plates, M.P. 109–109.5° C., with decomposition, exhibiting an impact stability of 35–40 cm./2 kg. The elemental analysis of the product is as follows:

Calculated for $C_6H_9N_7O_{12}$: percent C, 19.41; percent H, 2.44; percent N, 26.42. Found: percent C, 19.90; percent H, 2.52; percent N, 26.91.

The heat of combustion was calculated to be 2232 cal./gm. and found to be 2298 cal./gm. The explosive values of this compound are as follows:

| | | |
|---|---|---|
| Lead Block Value | 162 | T.N.T.=100 |
| Ballistic Mortar Value | 153 | T.N.T.=100 |

EXAMPLE III

*Preparation of bis(2,2-dinitropropyl) nitramine*

In a flask fitted with a mechanical stirrer and thermometer was placed 100 ml. of 100% nitric acid. While maintaining the temperature from 5–10° C., 100 ml. of acetic anhydride was added dropwise. To this solution was added 7.4 gm. (0.026 mole) of bis(2,2-dinitropropyl) amine. The resulting solution was stirred for 45 minutes while maintaining the temperature at 5–10° C. It was then poured over ice precipitating a white solid which was collected, washed with water and dried. Recrystallization from methanol yielded a product having a M.P. of 187–189° C. and an impact stability of 20 cm./2 kg. The elemental analysis of the product is as follows:

Calculated for $C_6H_{10}N_6O_{10}$: percent C, 22.09; percent H, 3.09; percent N, 25.77. Found: percent C, 22.52; percent H, 3.14; percent N, 25.77.

EXAMPLE IV

*Preparation of bis(2,2-dinitroamyl) nitramine*

To a solution of 100 ml. of 100% nitric acid and 100 ml. of acetic anhydride cooled to 5° C. was added 6.2 gm. of crude bis(2,2-dinitroamyl) amine. The solution was poured on ice to precipitate a white solid. The product was collected, washed with water and dried to yield 5.8 gm. of a white solid. Recrystallization from carbon tetrachloride yielded a product having a M.P. of 101–103° C. The elemental analysis of the product is as follows:

Calculated for $C_{10}H_{18}N_6O_{10}$: percent C, 31.42; percent H, 4.75; percent N, 21.99. Found: percent C, 31.70; percent H, 4.85; percent N, 21.22.

EXAMPLE V

*Preparation of bis(2,2-dinitrobutyl) nitramine*

A solution of bis(2,2-dinitrobutyl) amine in acetic anhydride was added dropwise to 100% nitric acid while maintaining the temperature at 5° C. The resulting solution was poured over ice yielding a yellow oil which slowly crystallized. The solid was collected, washed with water and recrystallized from chloroform to give a cream-colored solid. Recrystallization from chloroform yielded 9. A steroid of the general formula

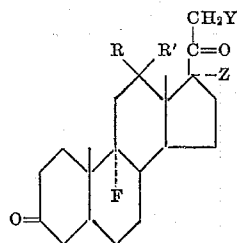

wherein individually R is hydrogen, R' is selected from the group consisting of β-hydroxy and β-acyloxy, and together R and R' is keto, Y is selected from the group consisting of hydrogen, hydroxy and acyloxy, and Z is selected from the group consisting of hydrogen and α-hydroxy.

10. A process for preparing a steroid of the general formula

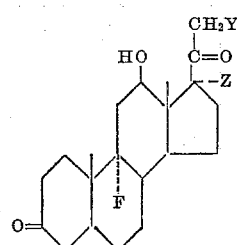

wherein Y is selected from the group consisting of hydrogen, hydroxy and acyloxy, and Z is selected from the group consisting of hydrogen and α-hydroxy, which comprises interacting a steroid of the general formula

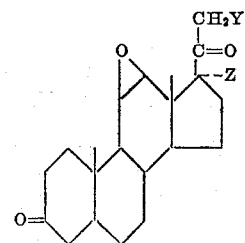

wherein Y and Z are as above defined, with hydrogen fluoride and recovering the 9α-fluoro-12β-hydroxy steroid formed.

11. A process for preparing 9α-fluoropregnane-12β-ol-3,20-dione, which comprises interacting 11β,12β-epoxypregnane-3,20-dione with hydrogen fluoride and recovering the 9α-fluoro-12β-hydroxy steroid formed.

12. A process for preparing 9α-fluoro-12β-hydroxyprogesterone, which comprises interacting 11β,12β-epoxyprogesterone with hydrogen fluoride and recovering the 9α-fluoro-12β-hydroxy steroid formed.

References Cited in the file of this patent
UNITED STATES PATENTS

| | | |
|---|---|---|
| 2,773,076 | Reichstein | Dec. 4, 1956 |
| 2,789,117 | Sarett | Apr. 16, 1957 |

14. The method of preparing bis(2,2-dinitropropyl) nitramine which comprises reacting bis(2,2-dinitropropyl) amine with nitric acid.

15. The method of preparing bis(2,2-dinitroamyl) nitramine which comprises reacting bis(2,2-dinitroamyl) amine with nitric acid.

16. The method of preparing bis(2,2-dinitrobutyl) nitramine which comprises reacting bis(2,2-dinitrobutyl) amine with nitric acid.

References Cited in the file of this patent

UNITED STATES PATENTS 2,731,460    Schenck et al. _____ Jan. 17, 1956